(12) United States Patent
Konter et al.

(10) Patent No.: US 8,043,052 B2
(45) Date of Patent: Oct. 25, 2011

(54) FLUID FLOW MACHINE

(75) Inventors: Maxim Konter, Klingnau (CH); Sergey Vorontsov, Moscow (RU); Alexander Khanin, Moscow (RU); Alexey Karelin, Moscow (RU); Alexander Bone, Moscow (RU)

(73) Assignee: ALSTOM Technology Ltd., Baden (CH)

( * ) Notice: Subject to any disclaimer, the term of this patent is extended or adjusted under 35 U.S.C. 154(b) by 57 days.

(21) Appl. No.: 12/605,405

(22) Filed: Oct. 26, 2009

(65) Prior Publication Data

US 2010/0111683 A1 May 6, 2010

Related U.S. Application Data

(63) Continuation of application No. PCT/EP2008/054141, filed on Apr. 7, 2008.

(30) Foreign Application Priority Data

Apr. 24, 2007 (CH) ..................................... 674/07

(51) Int. Cl.
*F01D 9/04* (2006.01)
(52) U.S. Cl. ...................................... 415/191; 415/195
(58) Field of Classification Search .................. 415/191, 415/192, 193, 194, 195, 99.5, 211.211, 199.5, 415/211.2
See application file for complete search history.

(56) References Cited

U.S. PATENT DOCUMENTS

| | | |
|---|---|---|
| 4,131,387 A | 12/1978 | Kazin et al. |
| 6,036,438 A | 3/2000 | Imai |

FOREIGN PATENT DOCUMENTS

| | | |
|---|---|---|
| CH | 492868 | 6/1970 |
| DE | 4228879 | 3/1994 |
| EP | 0916812 | 5/1999 |
| EP | 1731716 | 12/2006 |
| JP | 57-18405 | 1/1982 |
| JP | 2001-221006 | 8/2001 |
| JP | 2005-220797 | 8/2005 |
| WO | WO2008/128877 | 10/2008 |

OTHER PUBLICATIONS

Search Report for Swiss Patent App. No. 0674/2007 (Sep. 5, 2007).
International Preliminary Examination Report for PCT Patent App. No. PCT/EP2008/054141 (Aug. 6, 2009).

*Primary Examiner* — Justine Yu
*Assistant Examiner* — Jesse Prager
(74) *Attorney, Agent, or Firm* — Cermak Nakajima LLP; Adam J. Cermak

(57) ABSTRACT

A fluid flow engine (1), in particular a turbo engine, has at least one guide vane row (5) with a plurality of guide vanes (6) and at least one rotor blade row (7) with a plurality of rotor blades (8). One guide vane row (5) and one rotor blade row (7) that follows the former directly downstream with respect to a working gas flow (11), together form a stage (10) of the fluid flow engine (1). To reduce the load on the rotor blades (8), the guide vanes (6) and the rotor blades (8) are coordinated at least in one stage (10) so that in a reference relative position between the respective guide vane (6) and the respective rotor blade (8), there is an axial distance (B) and a circumferential distance (C) between the outgoing flow edge (16) of the respective guide vane (6) and the oncoming flow edge (17) of the respective rotor blade (8) that is measured in the axial direction and is varied along a height (H) of a gas path (12) running axially between the blade rows (5, 7) of this stage (10), said height being measured radially.

20 Claims, 3 Drawing Sheets

US 8,043,052 B2

FLUID FLOW MACHINE

This application is a Continuation of, and claims priority under 35 U.S.C. §120 to, International application no. PCT/EP2008/054141, filed 7 Apr. 2008, and claims priority therethrough under 35 U.S.C. §§119,365 to Swiss application no. 00674/07, filed 24 Apr. 2007, the entireties of which are incorporated by reference herein.

BACKGROUND

1. Field of Endeavor

The present invention relates to a fluid flow engine, and in particular to a turbo engine.

2. Brief Description of the Related Art

A fluid flow engine, in particular a turbo engine, e.g., a gas turbine, a steam turbine, or a compressor, usually has a stator and a rotor which is mounted in the stator to rotate about an axis of rotation. At least one guide vane row is formed on the stator, having a plurality of guide vanes arranged side by side in the circumferential direction with regard to the axis of rotation. The rotor has at least one rotor blade row having a plurality of rotor blades adjacent to one another with regard to the axis of rotation. One guide vane row and one rotor vane row following the former directly downstream with regard to a working gas flow form one step or pressure step of the fluid flow engine. During operation of the fluid flow engine, the rotor blades are exposed to extremely high loads in particular, which has effects on the lifetime of the rotor blades. To improve the economic aspect of the fluid flow engine, it is desirable to prolong the lifetime of the blades, in particular the rotor blades.

Fluid flow engines having the aforementioned features are disclosed in U.S. Pat. No. 411,387, Swiss Patent No. 492,866, U.S. Pat. No. 6,036,438, and German Patent Document number DE 4228879, and offer a comparatively long lifetime of the vanes. Furthermore JP57-018405, JP2001-221006, JP2005-220797 and EP0916812 show fluid flow engines wherein at least the axial distance between the outgoing flow edges of the vanes is varied along a radially measured height of the gas path running between the guide and the rotor vanes.

Many efforts have been made but an optimal design of the guide and rotor vanes has not been found.

SUMMARY

This is where the present invention begins. One of numerous aspects of the present invention relates to the problem of providing an improved embodiment of a fluid flow engine of the aforementioned type which is characterized in particular by a longer lifetime of the blades, in particular the rotor blades.

Another aspect is based on the general idea of coordinating the guide vanes and rotor blades with one another in at least one stage so that the distance between the outgoing flow edge of the respective guide vane and the oncoming flow edge of the respective rotor blade is varied as a function of the radial position in the axial direction and/or in the circumferential direction, whereby said function corresponds to a second-order polynomial. This makes use of the finding that each guide vane creates an intense wake downstream from its outgoing flow edge and the respective rotor blade must pass through the wake. As soon as this wake strikes the oncoming flow edge of the respective rotor blade, the result is a load cycle on the rotor blade. With a traditional design of rotor blades and guide vanes, it is possible that the on-coming flow edge of the rotor blade is simultaneously impacted everywhere by the wake of the preceding guide vane, so the load of the rotor blades is comparatively high. Due to the inventive proposal it can be evidently achieved that the load caused by the wake on the oncoming edge is temporally expanded and occurs at optimal moments. The dynamic load on the rotor blades is reduced along with the absolute load. This makes it possible to increase the lifetime of the rotor blades.

According to an advantageous embodiment, the guide vanes and rotor blades of the respective stage may be coordinated so that the axial distance along the gas path height at first decreases to a minimum from the inside radially to the outside radially and then increases again. This achieves the result that the axial spacing in the area of the rotor blade tip and in the area of the tip of the guide vane is comparatively great, so that the wake is diminished, which in turn reduces the load on the rotor blades and guide vanes in this area.

Other important features and advantages of the inventive fluid flow engine are derived from the drawings and the respective description of figures on the basis of the drawings.

BRIEF DESCRIPTION OF THE DRAWINGS

Preferred exemplary embodiments of the invention are illustrated in the drawings and explained in greater detail in the following description, where the same reference numerals are used to refer to the same or similar or functionally identical components.

In schematic diagrams in each.

DETAILED DESCRIPTION OF EXEMPLARY EMBODIMENTS

Figure 1:
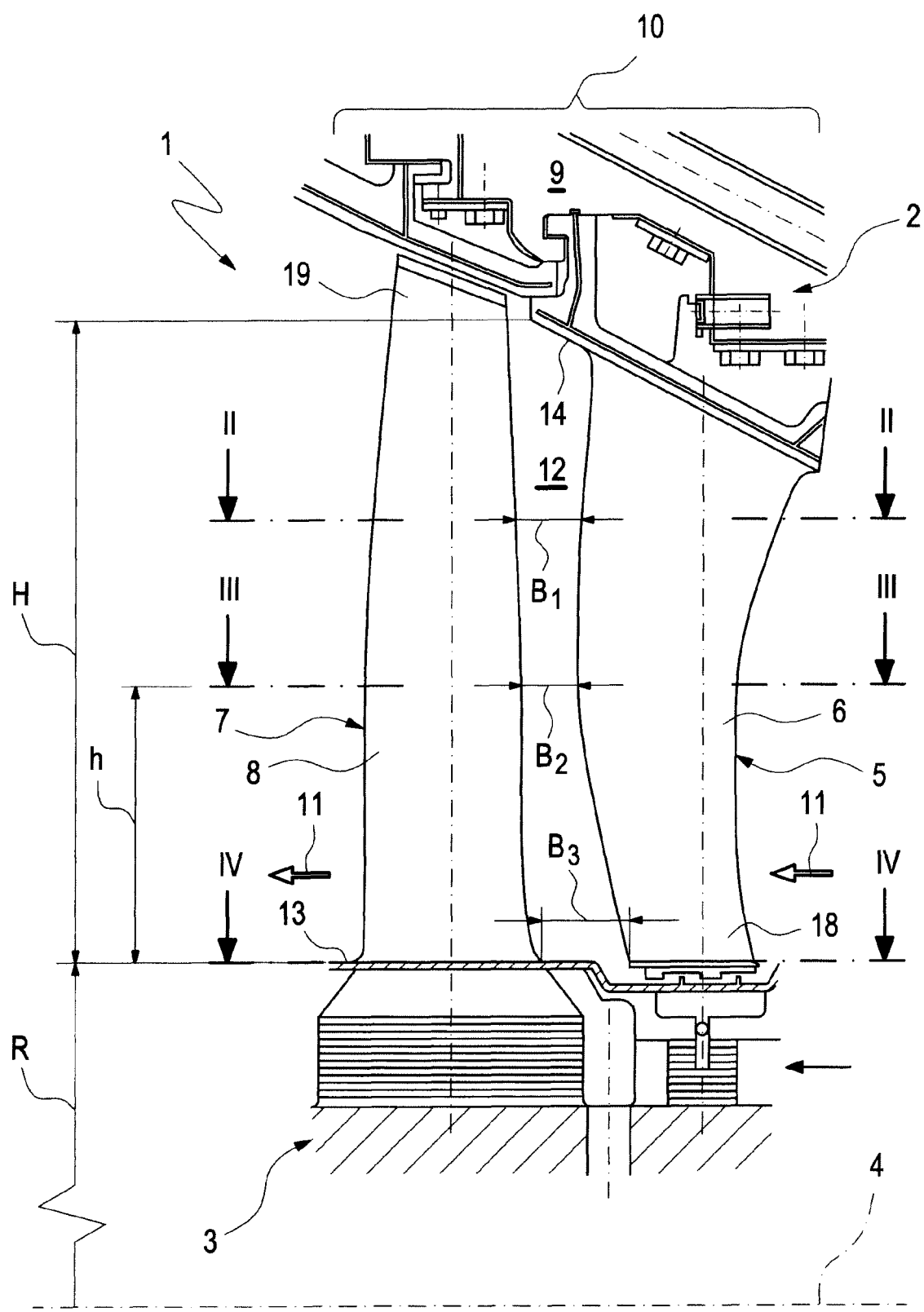
FIG. 1 shows an axial section through a fluid flow engine in the area of one stage.

According to FIG. 1, a fluid flow engine 1, shown only partially here, includes a stator 2, likewise shown only partially here, and a rotor 3, likewise shown only partially here, mounted to rotate about an axis of rotation 4 in the stator 2. This fluid flow engine 1 is preferably a turbo engine, e.g., a gas turbine or a steam turbine or a compressor. Principles of the present invention are preferably applied to a gas turbine.

The fluid flow engine 1 has at least one guide vane row 5 formed by a plurality of guide vanes 6 arranged adjacent to one another with respect to the axis of rotation 4, but only one of these guide vanes is shown in FIG. 1. FIG. 1 shows a detail of the fluid flow engine 1 in which there is only one such guide vane row 5. It is clear that the fluid flow engine 1 may essentially have a plurality of such guide vane rows 5. Furthermore, the fluid flow engine 1 includes at least one rotor blade row 7 having a plurality of rotor blades 8 arranged adjacent to one another in the circumferential direction. Here again only one rotor blade 8 is discernible. The fluid flow engine 1 in the detail shown in FIG. 1 has only one such rotor 1 blade row 7. It is clear that the fluid flow engine 1 may also have a plurality of such rotor blade rows 7. The guide vanes 6 of the respective guide vane row 5 are mounted on the stator 2, in particular on a guide vane carrier 9. In contrast with that, the rotor blades 8 of the respective rotor blade row 7 are mounted on the rotor 3.

One guide vane row 5 and one rotor blade row 7 in axial proximity to the former together form one stage 10 of the turbo engine 1. The stage 10, which may also be referred to as the pressure stage, is indicated by a curly French bracket in FIG. 1. Within the respective stage 10, the rotor blade row 7 is arranged downstream from the respective guide vane row 5 with respect to a working gas flow 11, as indicated by the direction of flow arrows. A gas path 12 formed essentially by a ring-shaped axial gap between the blade rows 5, 7 of the respective stage 10 runs axially between the blade rows 5, 7 of the same stage 10. The gas path 12 is bordered radially on the inside by a bottom 13 of the respective rotor blades 8 and on the outside radially by a bottom 14 of the respective guide vanes 6. In the radial direction, the gas path 12 has a height H, which is formed in a converging or expanding cross-sectional plot by the average height inside the gas path 12 between the stage 10. The bottom 13 of the respective rotor blades 8 is a radial distance R from the axis of rotation 4 in the radial direction.

It is clear that the fluid flow engine 1 may fundamentally have a plurality of such stages 10. At least one of these stages 10 is designed according to this invention, which is explained in greater detail below with reference to FIGS. 2 through 4.

Figure 2:
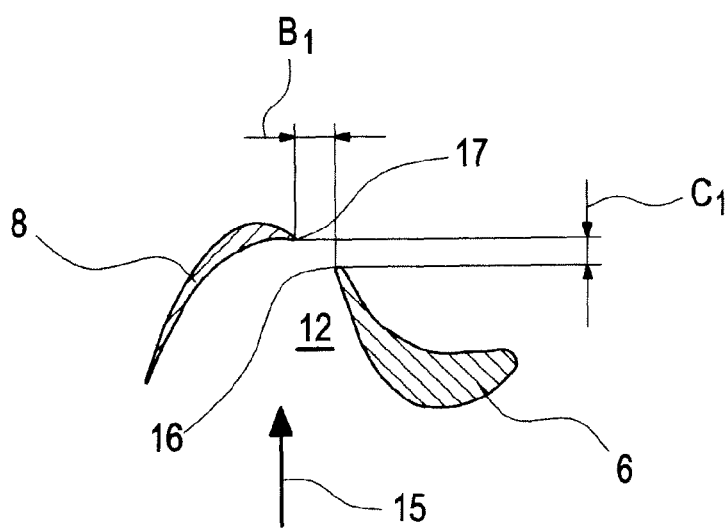
FIG. 2 shows a sectional view according to sectional lines II in FIG. 1.
Figure 3:
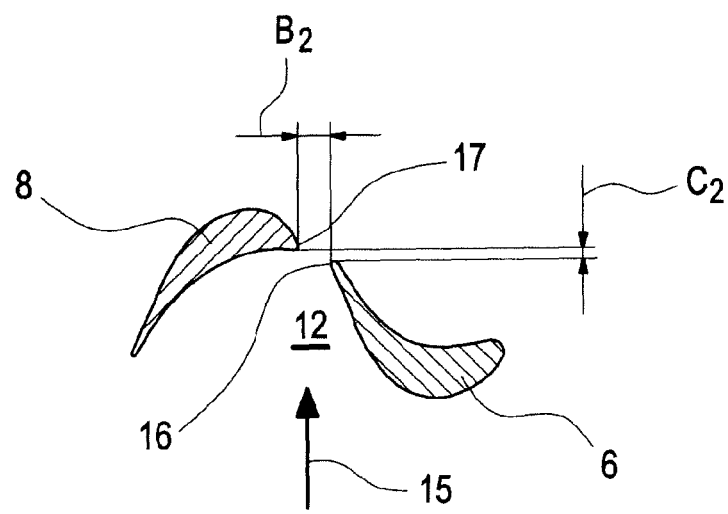
FIG. 3 shows a sectional view according to sectional lines III in FIG. 1.
Figure 4:
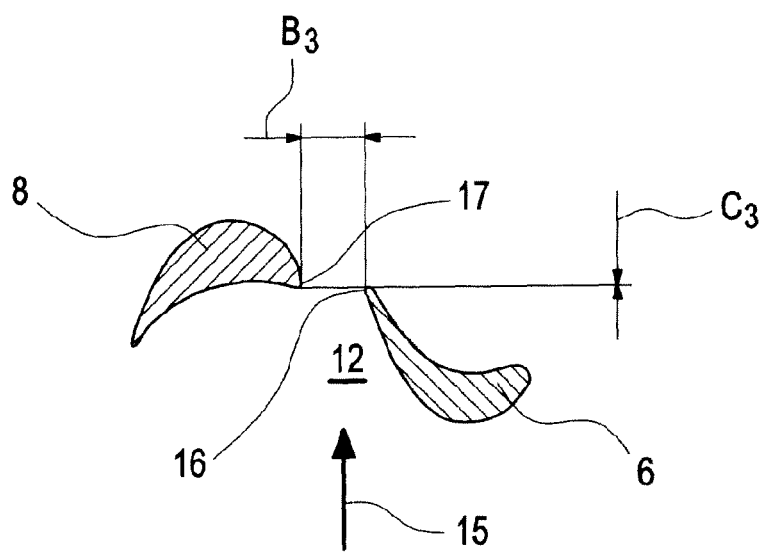
FIG. 4 shows a sectional view according to sectional lines IV in FIG. 1.

FIGS. 2 through 4 show sections through the stage 10 in various sectional planes drawn at different height positions h through the guide vanes 6 and rotor blades 8 that are shown. FIG. 2 shows a section through the sectional plane II while FIG. 3 shows a section in the sectional plane III and FIG. 4 shows a section through the sectional plane IV. In FIGS. 2 through 4 the direction of rotation of the rotor blades 8 is indicated by an arrow 15 in each case. In the area of the gas path 12, i.e., the axial ring gap, each guide vane 6 has an outgoing flow edge 16 and each rotor blade 8 has an oncoming flow edge 17 there. In FIGS. 1 through 4, an axial distance measured in the axial direction is labeled as B with the three sectional planes shown here labeled accordingly. FIGS. 2 through 4 also show a circumferential distance C which is measured in the circumferential direction and is also indicated according to the three sectional planes. As FIGS. 1 through 4 show, the axial distance B varies along the height H of the gas path, i.e., in the radial direction. Such an axial distance B which varies as a function of the height position h within the gas path 12 can be achieved by a corresponding coordination of the guide vanes 6 and rotor blades 8. Additionally or alternatively, the guide vanes 6 and rotor blades 8 may also be designed and/or coordinated so that the circumferential distance C varies along the height H of the gas path 12, i.e., depends on the height position h. The dependence of the circumferential distance C and the axial distance B on the height position h may occur accumulatively or alternatively. These dependencies are implemented by a corresponding shaping of the rotor blades and/or the guide vanes 6. An embodiment in which traditional rotor blades 8 are combined with novel guide vanes 6 is preferred in order to achieve the desired dependence of the distances B and/or C. The guide vanes 6 are preferred for this shaping because they are exposed to lower loads during operation of the fluid flow engine 1.

Figure 5:
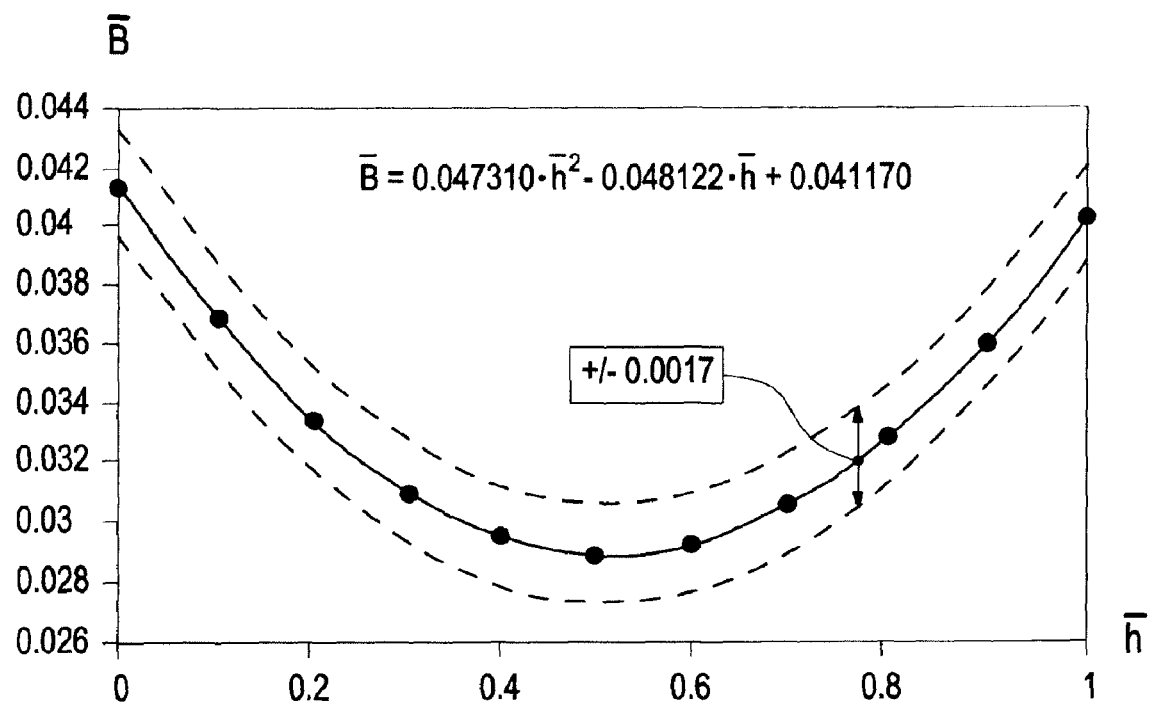
FIG. 5 shows a diagram to illustrate the curve of an axial spacing along a gas path height.

The designation indicated in FIG. 5 and/or in FIGS. 1 through 4 or the dependence of the axial distance B on the height position h is between the two blades 6, 8 in question in the case of a predetermined reference relative position. Since the rotor blades rotate according to the direction of rotation 15 during operation of the fluid flow engine 1, this reference position is repeatedly established with each pairing of blades within this stage 10.

As shown in FIGS. 1 through 4 and also in FIG. 5 in particular, the guide vanes 6 and the rotor blades 8 are preferably coordinated so that the axial distance B at first decreases along the height H of the gas path 12 from a maximum on the inside radially with an increase in the height position h, i.e., from the inside radially to the outside radially, and then increases again, where it may again reach a maximum in an area on the outside radially. The increase in the axial distance B in the area of guide vane tip 18 shown in FIG. 1 and in the area of a rotor blade tip 19 shown in FIG. 1 reduces the fluid dynamic load on the sensitive blade tips 18, 19 because of the increase in the flow path associated with this in the axial direction. As shown in FIG. 5 in particular, the course of the axial distance B shown in FIG. 5 has its minimum at approximately 50% of the total height H of the gas path 12. In FIG. 5, the standardized axial distance $\overline{B}$ is plotted on the ordinate. The standardized axial distance $\overline{B}$ corresponds to the actual axial distance B based on the radial distance R of the rotor blade bottom 13 from the axis of rotation 4, so that $\overline{B}=B/R$.

In the diagram according to FIG. 5, the standardized relative height $\overline{h}$, i.e., the standardized height position $\overline{h}$, is shown on the abscissa. The standardized height position $\overline{h}$ is obtained from the actual height position h based on the total height H, so $\overline{h}=h/H$.

The guide vanes 6 and rotor blades 8 are expediently coordinated so that the dependence of the axial distance B on the height position h corresponds to a second-order polynomial. This means that the axial distance B varies along the gas path height H according to a second-order polynomial. Such a second-order polynomial is formed as follows:

$$\overline{B}=b_2 \cdot \overline{h}^2 + b_1 \cdot \overline{h} + b_0 \pm b_k$$

The coefficients b of this polynomial are preferably selected so that coefficient $b_0$ is greater than zero and has a value of +0.04117 in particular. The coefficient $b_1$ is preferably negative, i.e., less than zero. The coefficient $b_1$ may have a value of −0.048122 in particular. The coefficient $b_2$ is expediently selected to be greater than zero and may have a value of +0.04731 in particular. The coefficient $b_k$ forms a correction value which defines a tolerance range, so to speak, within which the curve of the axial distance B may run along the total height H to be able to achieve the desired inventive effect in a particularly advantageous manner. The bandwidth achieved with the help of the correction coefficient $b_k$ is indicated in FIG. 5 by broken lines on both sides of the line of the curve, where the shape of the curve shown with a solid line is obtained in the absence of correction coefficient $b_k$.

Figure 6:
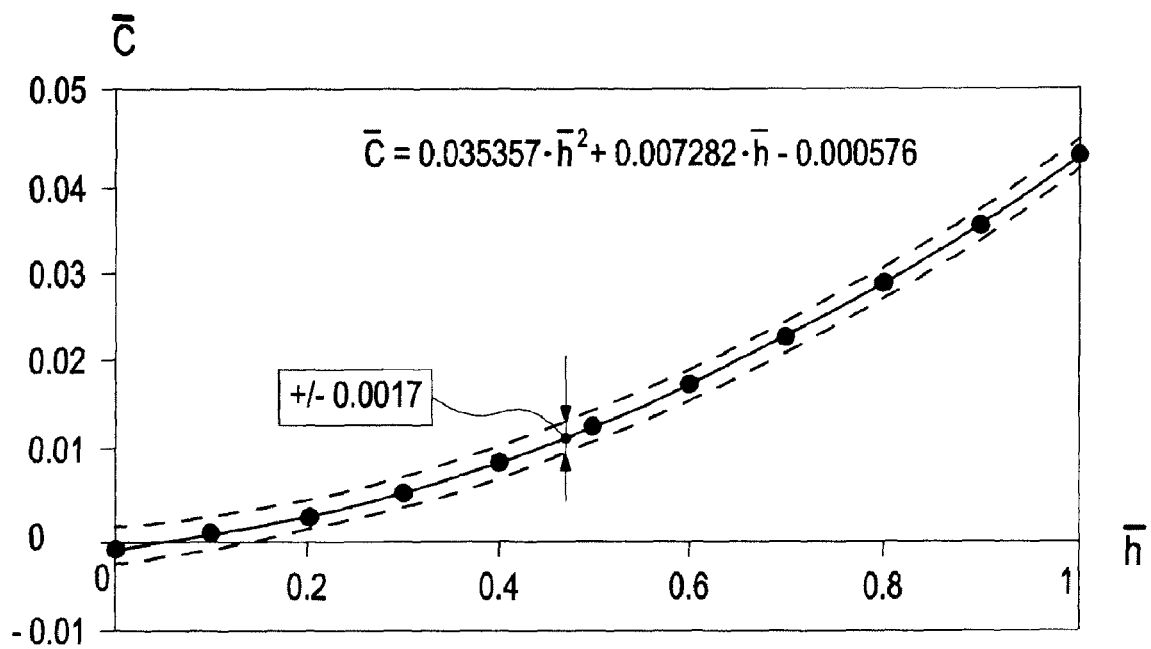
FIG. 6 shows a diagram to illustrate the curve of the circumferential distance along a gas path height.

According to FIGS. 2 through 4 and in view of FIG. 6 in particular, it can be seen that the guide vanes 6 and the rotary blades 8 are expediently designed and coordinated so that the circumferential distance C increases steadily from the inside radially to the outside radially with an increase in the height position h. This means that the dependence of the circumferential distance C shown in FIG. 6 on the radial position, i.e., the height position h has its minimum on the inside radially and its maximum on the outside radially. The diagram in FIG. 6 shows the standardized circumferential distance $\overline{C}$ on the ordinate. This is obtained from the actual circumferential distance C based on the radial distance R. Therefore, $\overline{C}=C/R$. The abscissa is also represented by the standardized height position $\overline{h}$ in FIG. 6.

For the reference relative position mentioned above between the blades 6, 8 in question of stage 10 this yields the relationship shown here and/or the dependence of the circumferential distance C on the height position h shown here. This reference relative position may be defined, for example, so that the circumferential distance C has essentially a value of zero on the inside radially, i.e., at the height of the rotor blade bottom 13. This is essentially the case with the sectional plane III according to FIG. 4.

According to FIG. 6 and according to FIGS. 2 through 4, the circumferential distance C along the gas path height H may behave like a second-degree function, i.e., a second-order polynomial. For example, such a polynomial may be formed as follows:

$$\overline{C}=c_2 \cdot \overline{h}^2+c_1 \cdot \overline{h}+c_0 \pm c_k$$

The coefficients c of this polynomial can be determined as follows, for example: the coefficient $c_0$ is preferably negative and may have a value of −0.000576. The coefficient $c_1$ is preferably positive and may have a value of +0.007282, for example. The coefficient $c_2$ is preferably positive and may have a value of 0.035357 in particular. The coefficient $c_k$ forms a correction coefficient which more or less defines a bandwidth or tolerance range of allowed deviations of the curve of the circumferential distance C along the height H. The correction coefficient $c_k$ has a value of 0.0017, for example. As in FIG. 5, FIG. 6 shows the curve of the standardized circumferential distance $\overline{C}$ with a solid line as a function of the standardized height position $\overline{h}$ without the correction coefficient $c_k$. Two broken lines on both sides of the curve shown with a solid line define the tolerance range which is obtained when taking into account the correction coefficient $c_k$.

LIST OF REFERENCE NOTATION

1 fluid flow engine
2 stator
3 rotor
4 axis of rotation
5 guide vane row
6 guide vane
7 rotor blade row
8 rotor blade
9 guide vane carrier
10 stage
11 working gas flow
12 gas path
13 rotor blade bottom
14 guide vane bottom
15 direction of rotation
16 outgoing flow edge
17 oncoming flow edge
18 guide vane tip
19 rotor blade tip
h height position
$\overline{h}$ standardized height position
H height of 12
R radial distance of the rotor blade bottom 13
B axial distance
$\overline{B}$ standardized axial distance
b coefficient
C circumferential distance
$\overline{C}$ standardized circumferential distance
c coefficient While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A fluid flow engine comprising:
at least one guide vane row with a plurality of guide vanes;
at least one rotor blade row having a plurality of rotor blades;
one guide vane row and one rotor blade row following said one guide vane row directly downstream with respect to a working gas flow together forming a stage of the fluid flow engine;
wherein, in at least at one stage, the guide vanes and the rotor blades are configured and arranged so that, in a reference relative position of the respective guide vane and the respective rotor blade, an axial distance B axially measured with respect to a rotational axis of a rotor of the fluid flow engine, and a circumferential distance C circumferentially measured with respect to the rotational axis of the fluid flow engine between an outgoing flow edge of the respective guide vane and an oncoming flow edge of the respective rotor blade, vary along a radially measured height H of a gas path running axially between blade rows of said at least one stage; and
wherein the axial distance B and the circumferential distance C vary according to a second-order polynomial.

2. The fluid flow engine according to claim 1, wherein axial distance B decreases at first to a minimum from the inside radially to the outside radially along the gas path height H and then increases.

3. The fluid flow engine according to claim 2, wherein said minimum of the axial distance B is approximately 50% of the gas path height H.

4. The fluid flow engine according to claim 1, wherein each blade has a bottom, and said second-order polynomial has the form:

$$\overline{B}=b_2 \cdot \overline{h}^2+b_1 \cdot \overline{h}+b_0 \pm b_k$$

where
$\overline{B}$=B/R, and
$\overline{h}$=h/H, and
R=radial distance of a rotor blade bottom from the axis of rotation.

5. The fluid flow engine according to claim 4, wherein the coefficient $b_0$ is positive.

6. The fluid flow engine according to claim 5, wherein the coefficient $b_0$ has a value of +0.04117.

7. The fluid flow engine according to claim 4, wherein the coefficient $b_1$ is negative.

8. The fluid flow engine according to claim 7, wherein the coefficient $b_1$ has a value of −0.048122.

9. The fluid flow engine according to claim 4, wherein the coefficient $b_2$ is positive.

10. The fluid flow engine according to claim 9, wherein the coefficient $b_2$ has a value of +0.04731.

11. The fluid flow engine according to claim 4, wherein the coefficient $b_k$ has a value of 0.0017.

12. The fluid flow engine according to claim 1, wherein the circumferential distance C increases from the inside radially to the outside radially only along the gas path height H when the guide vanes and the rotor blades are oriented so that the circumferential distance C has a value of approximately zero on the inside radially.

13. The fluid flow engine according to claim 12, wherein each blade has a bottom, and the second-order polynomial describing the circumferential distance C has the form:

$$\overline{C}=c_2\cdot\overline{h}^2+c_1\cdot\overline{h}+c_0\pm c_k$$

where
$\overline{C}=C/R$, and
$\overline{h}=h/H$, and
R=radial distance of a rotor blade bottom from the axis of rotation.

14. The fluid flow engine according to claim 13, wherein the coefficient $c_0$ is negative.

15. The fluid flow engine according to claim 14, wherein the coefficient $c_0$ has a value of −0.000576.

16. The fluid flow engine according to claim 13, wherein the coefficient $c_1$ is positive.

17. The fluid flow engine according to claim 16, wherein the coefficient $c_1$ has a value of +0.007282.

18. The fluid flow engine according to claims 13, wherein the coefficient $c_2$ is positive.

19. The fluid flow engine according to claim 18, wherein the coefficient $c_2$ has a value of 0.035357.

20. The fluid flow engine according to claim 13, wherein the coefficient $c_k$ has a value of 0.0017.

* * * * *